Dec. 19, 1922.  1,439,372
C. R. LOTT.
TEMPERATURE CONTROLLING AND LUBRICATING MEANS FOR MOLD PLUNGERS.
FILED MAR. 15. 1920.
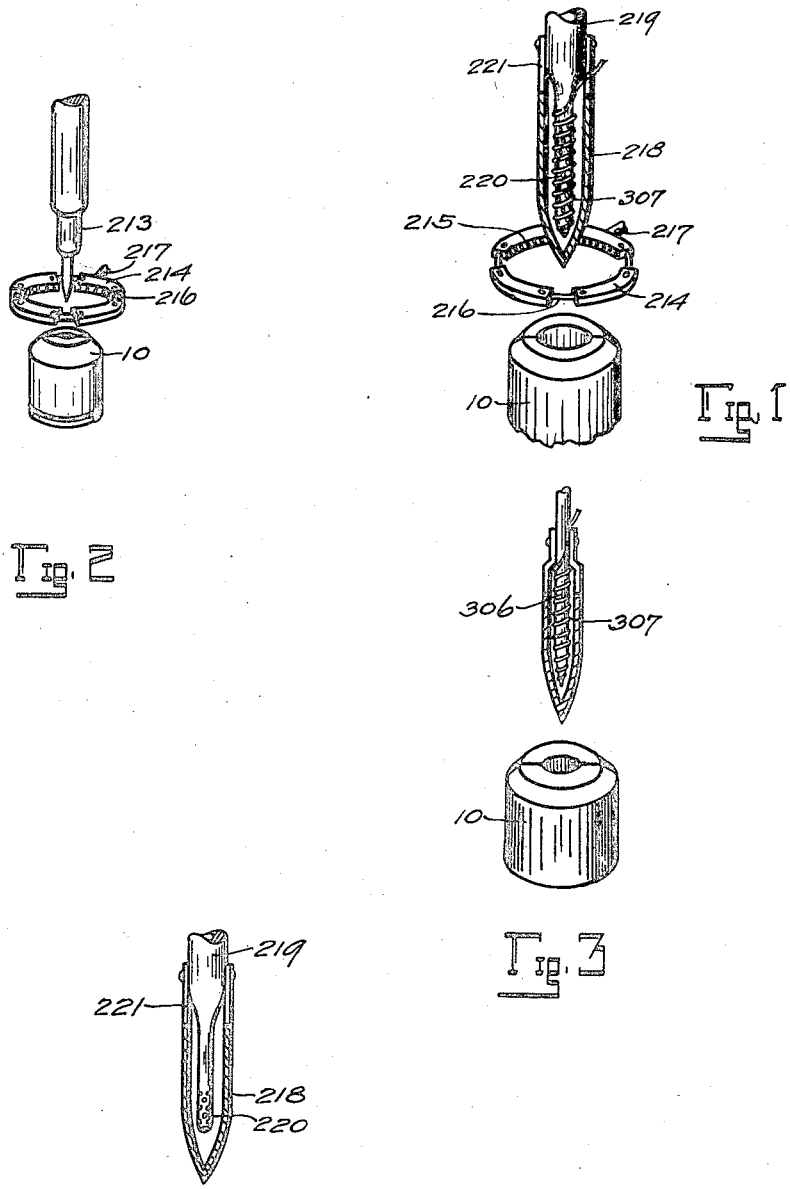
INVENTOR
Clyde R. Lott,
By J. F. Rule
His attorney.
WITNESS
Leonard Soubier Patented Dec. 19, 1922.

1,439,372

UNITED STATES PATENT OFFICE.

CLYDE R. LOTT, OF WASHINGTON, DISTRICT OF COLUMBIA, ASSIGNOR TO THE OWENS BOTTLE COMPANY, OF TOLEDO, OHIO, A CORPORATION OF OHIO.

TEMPERATURE-CONTROLLING AND LUBRICATING MEANS FOR MOLD PLUNGERS.

Application filed March 15, 1920. Serial No. 365,786.

*To all whom it may concern:*

Be it known that I, CLYDE R. LOTT, a citizen of the United States, residing at Washington, in the District of Columbia, have invented new and useful Improvements in Temperature-Controlling and Lubricating Means for Mold Plungers, of which the following is a specification.

My invention relates to improvements in glass forming machines and particularly to means for heating, cooling or regulating the temperature of the core or plunger by which an initial blow opening is formed in the charge of glass in the mold, and also to suitable means for lubricating said plunger.

The present application includes subject matter disclosed in my co-pending application, Serial Number 519,678, filed September 27, 1909, and is a continuation thereof as regards said subject matter.

In the accompanying drawings:

Figure 1 is a view of a plunger and associated parts constructed in accordance with the principles of my invention.

Figure 2 shows a modified form of plunger core particularly adapted for making small ware.

Figure 3 shows a plunger in which the electrical means only for heating is provided.

Figure 4 shows a construction in which the use of a heating or cooling fluid alone is relied on for controlling the temperature.

The plunger comprises a hollow core or point 218 in the form of a shell or casing surrounding a pipe 219. This pipe is provided with perforations 220 for the escape of air to cool the point. The air may be supplied to the pipe in any suitable manner and the point or casing is provided with slots 221 near its upper portion to permit the air to escape. The perforations 220 are distributed so that the air will be diffused through the hollow point so as to uniformly cool it from the inside, particularly during the pressing operation. Such cooling may be required in making comparatively large ware in which the large mass of glass in contact with the plunger tends to overheat it. On the other hand, in making certain kinds of ware the plunger is in contact with only comparatively small masses of glass, and it may be desirable to heat the plunger during the pressing operation to keep the glass at a uniform temperature. This may be done by supplying a suitable combustible gas through the pipe 219, which burns within the hollow plunger.

Further means for heating the plunger comprises an electrical resistance coil 307 surrounding the pipe 219 within the shell 218, and used either in conjunction with or independently of the gas. If desired, the heating coil 307 may surround a solid stem 306, as shown in Figure 3.

A still further means for controlling the temperature of the core comprises a ring or series of arc shaped hollow members 214 arranged around the point, said members each being provided with a plurality of openings 215, and communicating with each other by means of short sections of pipe 216, one of the members being provided with a gas supply pipe 217. The perforations 215 are in the inner faces of the members so that the plunger point passes through a ring of heat during each upward and downward movement. The members 214 being adjustable along the pipe sections 216 permits the diameter of the ring to be increased or decreased, whereby the heat may be concentrated to a greater or less degree. This heating ring may be used either in combination with, or independently of the other heating devices. If desired, a cooling fluid may be passed through the perforations 215 to cool the plunger during the pressing operation or when it is withdrawn from the glass. The ring 214 moreover provides a means for lubricating the plunger by squirting or atomizing onto the plunger a lubricant supplied through the openings 215, the lubricating material being supplied through the pipe 217.

In the construction shown in Figure 2, the plunger is provided with a sleeve 213 of asbestos adjacent to the point of the plunger, the latter as shown being a solid core for entering the mold. Figure 4 shows an arrangement in which the electrical heating coil is omitted.

It will be understood that the plunger is periodically moved downward to enter the mold 10 and by its pressure assist in forming the neck of the bottle, and also to form an initial blow opening in the glass which is afterward blown to its final shape, all as set forth in my co-pending application above mentioned.

Modifications may be resorted to within the spirit and scope of my invention.

What I claim is:

1. The combination with a mold, of a plunger, and an annular hollow member comprising telescoping sections surrounding the plunger and formed with openings facing the plunger.

2. The combination of a mold, a plunger, and an annular member surrounding the plunger and formed with openings through which a fluid may be directed against the plunger, said member comprising adjustable sections permitting the diameter to be adjusted.

3. In a glass forming machine, the combination of a mold, a plunger to enter the mold, and means carried with the plunger as it moves into and out of the mold to electrically heat said plunger.

4. In a device of the class described, a plunger for forming a cavity in a charge of molten glass, and means for heating the plunger comprising a plurality of arc-shaped hollow bodies arranged in a circle enclosing the plunger, said bodies being telescopically connected with each other for relative adjustment to adjust the diameter of the circle and having openings on the inner faces thereof, one of said bodies being provided with an inlet fuel pipe.

5. In a device of the class described, a plunger comprising a hollow cylindrical casing tapering to a point, a pipe adapted to be connected with a fuel supply and extending within the casing, said pipe having a plurality of perforations near the end thereof, the casing being provided with slots for the purpose set forth.

6. The combination of a mold, a plunger, and an annular hollow member surrounding the plunger and provided with openings facing the plunger, said member comprising telescoping sections permitting the diameter of said member to be increased or decreased.

7. The combination of a mold, a plunger comprising a cylindrical shell terminating in a pointed tip, said plunger adapted to enter the mold, a perforated hollow core within said shell, and an electric coil within the shell.

8. The combination with a mold, of a hollow plunger movable into and out of the mold, means to circulate a fluid within the plunger, and electrical heating means within the plunger.

9. The combination with a mold, of a hollow plunger movable into and out of the mold, means to circulate a fluid within the plunger, electrical heating means within the plunger, and means located externally of the plunger for lubricating the outer surface thereof.

10. The combination of a mold, a plunger movable into and out of the mold, said plunger comprising a hollow cylindrical casing, a tubular core within said casing, said core provided with a multiplicity of perforations permitting a fluid supplied through said core to be diffused within the casing, the latter provided with means for the escape of said fluid, and an electric coil within the casing.

11. In a glass machine, the combination of a hollow body, a plunger to enter said body, and means carried with the plunger as it moves into and out of said body to electrically heat the plunger.

12. In a glass machine, the combination of a hollow reciprocating plunger, means to circulate a fluid within the plunger, and a temperature regulating coil within the plunger.

13. In a glass machine, a plunger comprising a hollow cylindrical casing, a tubular core within said casing, said core provided with a multiplicity of perforations permitting a fluid supplied through said core to be diffused within the casing, the latter being provided with means for the escape of said fluid, and temperature regulating means within the casing.

Signed at Washington, in the District of Columbia, this 3rd day of March, 1920.

CLYDE R. LOTT.